(12) United States Patent
Nehl

(10) Patent No.: US 10,001,157 B2
(45) Date of Patent: Jun. 19, 2018

(54) EXPANSIBLE FIXING PLUG

(71) Applicant: fischerwerke GmbH & Co. KG, Waldachtal (DE)

(72) Inventor: Wolfgang Nehl, Waldachtal (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 0 days. days.

(21) Appl. No.: 15/327,683

(22) PCT Filed: Jul. 9, 2015

(86) PCT No.: PCT/EP2015/001406
§ 371 (c)(1),
(2) Date: Jan. 20, 2017

(87) PCT Pub. No.: WO2016/015823
PCT Pub. Date: Feb. 4, 2016

(65) Prior Publication Data
US 2017/0211605 A1    Jul. 27, 2017

(30) Foreign Application Priority Data
Jul. 29, 2014    (DE) .......................... 10 2014 110 734

(51) Int. Cl.
*F16B 13/12*    (2006.01)
(52) U.S. Cl.
CPC ............ *F16B 13/124* (2013.01); *F16B 13/12* (2013.01)
(58) Field of Classification Search
CPC ........ F16B 13/00; F16B 13/061; F16B 13/12; F16B 13/124
(Continued)

(56) References Cited

U.S. PATENT DOCUMENTS 3,323,404 A * 6/1967 Fischer ................. F16B 13/124
411/71
4,360,301 A * 11/1982 Mosberger ............ F16B 13/124
411/80.5
(Continued)

FOREIGN PATENT DOCUMENTS

DE        198 49 821 A1    3/2000
DE    10 2011 00053 A1    8/2011
(Continued)

OTHER PUBLICATIONS

International Search Report and Written Opinion for corresponding International Application No. PCT/EP2015/001406 dated Sep. 25, 2015.
(Continued)

*Primary Examiner* — Roberta S Delisle
(74) *Attorney, Agent, or Firm* — Renner Otto Boisselle & Sklar, LLP

(57) ABSTRACT

The invention relates to an expansible fixing plug (1) which consists of at least two different plastics materials, having a main body (2) made of the first plastics material, which is at least partly encased by a casing (3) made of the second plastics material. The main body (2) has an expansion region (5), which extends along a longitudinal axis (L) and has at least two expansion tongues (11, 12) which are separated from one another by a first slot (13), and a sleeve (6) arranged at the front of the expansible fixing plug (1) in the direction of introduction (E). The sleeve (6) is connected to the expansion region (5) and is at least partly encased by a casing body (18) formed by the casing (3). In order to obtain an expansible fixing plug (1) having improved expansion behavior, it is proposed that on the casing body (18) there be arranged at least one wing element (22) which, starting from the casing body (18), extends cantilever-like in a direction (Continued)

opposite to the direction of introduction (E) and substantially in the longitudinal direction (L).

12 Claims, 3 Drawing Sheets

(58) Field of Classification Search
USPC .............................. 411/80.1, 80.2, 80.5, 80.6
See application file for complete search history.

(56) References Cited

U.S. PATENT DOCUMENTS

| | | | | |
|---|---|---|---|---|
| 4,662,808 A * | 5/1987 | Camilleri | ................ | F16B 13/12 411/340 |
| 5,230,595 A * | 7/1993 | Fischer | ................ | F16B 13/124 411/508 |
| 5,352,066 A * | 10/1994 | Schaeffer | ............. | E21D 20/025 405/259.4 |
| 6,837,658 B2 * | 1/2005 | Nehl | ..................... | F16B 13/124 411/36 |
| 7,517,182 B2 * | 4/2009 | Cabrele | ................ | F16B 13/061 411/80.5 |
| 7,600,956 B2 * | 10/2009 | McDuff | .............. | F16B 13/0808 411/32 |
| 7,682,116 B2 * | 3/2010 | Cabrele | ................ | F16B 13/001 411/451.1 |
| 8,038,375 B2 * | 10/2011 | Kohan | .................. | F16B 13/001 411/80.5 |
| 2005/0158139 A1 * | 7/2005 | Hepworth | ............. | F16B 13/124 411/55 |
| 2008/0292422 A1 * | 11/2008 | Lin | ....................... | F16B 13/003 411/31 |
| 2009/0092459 A1 * | 4/2009 | Daly | .................... | F16B 13/124 411/80.1 |
| 2009/0252571 A1 | 10/2009 | Zimmerer et al. | | |

FOREIGN PATENT DOCUMENTS

| | | |
|---|---|---|
| EP | 2 108 851 A2 | 10/2009 |
| WO | WO 02/066845 A1 | 8/2002 |

OTHER PUBLICATIONS

English Translation of International Preliminary Report on Patentability for corresponding International Application No. PCT/EP2015/001406 dated Jan. 31, 2017.

* cited by examiner

EXPANSIBLE FIXING PLUG

TECHNICAL FIELD OF INVENTION

The invention relates to an expansible fixing plug having the features described herein.

DISCUSSION OF RELATED ART

FIGS. 5 to 8 of Offenlegungsschrift DE 10 2011 000 537 A1 disclose a generic expansible fixing plug which consists of a plurality of different plastics materials and which is produced in a multi-component injection-moulding process. The expansible fixing plug is used for fixing objects to an anchoring substrate and for that purpose can be inserted into a hole drilled in the anchoring substrate and expanded with an expander element. The expansible fixing plug has the internally located main body made of a first plastics material, shown in FIG. 6 of the Offenlegungsschrift. The main body extends in the longitudinal direction along a longitudinal axis and consists of a tubular insertion sleeve through which a screw, as expander element, can be inserted into an internally located expansion channel extending in the longitudinal direction. The expansion channel extends into an expansion region which adjoins the insertion sleeve in the direction of introduction of the fixing plug and which has four expansion tongues which are made of the first plastics material and are separated from one another by two intersecting slots. The expansion region is adjoined by a sleeve which consists of two sleeve parts connected to one another by V-shaped resilient connectors which are expansible in the circumferential direction. The main body is at least partly overmoulded with a casing made of a second plastics material. In the expansion region the casing forms expansion ribs which are elongated in the longitudinal direction and run parallel to the expansion tongues, which expansion ribs are connected to one another in the circumferential direction at their front and rear ends by ring-shaped elements. The ring-shaped elements, like the expansion ribs, are parts of the casing and are produced integrally with the expansion ribs from the second plastics material. On expansion of the expansible fixing plug, the expansion ribs become detached from the expansion tongues of the main body in the expansion region and, like the expansion tongues, are moved radially outwards.

SUMMARY OF THE INVENTION

The problem of the invention is to propose an expansible fixing plug that has improved expansion behaviour.

That problem is solved according to the invention by an expansible fixing plug having the features described herein. The expansible fixing plug according to the invention, which consists of at least two different plastics materials, comprises a main body made of a first plastics material and a casing, made of a second plastics material, which at least partly encases the main body. "Different plastics materials" means plastics materials which differ from one another, for example, in respect of their strength, their elasticity modulus, their chemical composition, their fibre content and/or their colour. The main body has an expansion region which extends in the longitudinal direction along a longitudinal axis and comprises at least two expansion tongues which are separated from one another by a first slot. The length of the slot accordingly defines the length of the expansion region. As a result of the formation of the first slot, the two expansion tongues can be moved away from one another and expanded in the radial direction, especially by the introduction of an expander element between the expansion tongues. In particular, the two expansion tongues are completely separated from one another by the first slot, but they can also be connected to one another by a thin injection-moulded skin or by resilient elements consisting of the first plastics material, which do not, however, appreciably impede the expansion of the expansion tongues but serve to guide the expander element. In particular, there is formed between the expansion tongues an expansion channel for receiving the expander element. The expander element is especially a screw. In addition, the expansible fixing plug has a sleeve which is arranged at the front in the direction of introduction and is connected to the expansion region and which is at least partly encased by a casing body that is formed by the casing and made of the second plastics material. The casing body is that part of the casing which is arranged in the region of the sleeve.

According to the invention there is arranged on the casing body at least one wing element which, starting from the casing body, extends cantilever-like in a direction opposite to the direction of introduction and substantially in the longitudinal direction. "Cantilever-like" means that the wing element is configured in such a way that the front end of the wing element in the direction of introduction is especially integrally connected to the casing body and the rear end of wing element is free and, apart from being connected to the casing body, is not connected to any other part of the casing. In particular, the wing element is held substantially non-interlockingly by the main body against radial movement in the outward direction. The "direction of introduction" is the direction in which the expansible fixing plug is introduced as intended into a drilled hole. The wing element is especially likewise produced from the second plastics material, so that, as casing element, it forms a part of the casing located in the expansion region. The cantilever-like wing element has the advantage that, on introduction of the expander element, its rear part can be displaced outwards and pressed against the wall of a drilled hole relatively easily, that is to say under only a small radially acting expansion force.

Preferably there are arranged on the casing body a plurality of wing elements which are not connected to one another at their rear ends in order that the wing elements can be expanded even under a small expansion force. Preferably, the wing elements are connected to one another exclusively by the casing body which at least partly encases the sleeve, so that there is no connection between the wing elements in the expansion region. This ensures that the wing elements are expansible with a small expansion force.

Furthermore, it is preferred that at least one wing element lies in an opening arranged in the expansion region. In particular, the opening is formed by the first slot or comprises the first slot which separates the two expansion tongues from one another. The wing element accordingly requires no additional space in the expansion region or requires only a very little additional space for which the expansion tongues would need to be weakened.

Preferably, at least one wing element extends over at least the entire length of the expansion region so that, as a result of the long lever arm, a small expansion force is sufficient for expansion even if the wing element is connected to the casing body in a manner that is rigid and resistant to bending.

Preferably, the expansible fixing plug according to the invention is configured in such a way that exactly two wing elements are arranged between exactly two expansion tongues. An expansible fixing plug of such configuration has a simple structure, because it consists of only a small number of large and simply shaped elements.

In a preferred arrangement of the expansible fixing plug according to the invention, at least one wing element especially slopes radially on the inside at its rear end, especially at an angle with respect to the longitudinal axis of the expansible fixing plug. Particularly when the wing element extends radially into the first slot as far as an expansion channel, such an arrangement has the advantage that the wing element does not impede the insertion of an expander element into the expansion channel.

Furthermore, it is preferred that at least one wing element, in an unexpanded state, projects in the radial direction beyond the main body in the expansion region. In particular, the rear end of the wing element projects beyond the main body. "Projects beyond" means here that the wing element, at least in a locally defined area, does not end radially flush with the expansion region, but forms a radial protuberance. Accordingly, even in the unexpanded state the wing element can come into contact with the wall of a drilled hole and act as an anti-rotation element which prevents co-rotation of the expansible fixing plug with the screw when a screw is screwed in as expander element.

Preferably, a second slot is arranged in the sleeve. The second slot is inclined with respect to the first slot. That means that a plane in which the first slot lies intersects, at an angle, a plane in which the second slot lies. In particular, the two slots, i.e. the two planes in which the slots lie, are orthogonal with respect to one another.

Preferably, on introduction of an expander element the expansion region of an expansible fixing plug according to the invention is expanded substantially in a first radial expansion direction, while the sleeve expands in a second radial expansion direction different therefrom. "Substantially" means here that, on introduction of the expander element, the expansion region or the sleeve widens to a greater extent in a preferred expansion direction than in other directions. However, this does not exclude the expansion region and/or the sleeve from also widening in other directions or from widening in circumference as a whole. In particular, the first slot is for that purpose configured in such a way that it does not extend into the sleeve. In particular, the two radial expansion directions of the expansion region and the sleeve are substantially orthogonal with respect to one another, with "substantially" here meaning that a deviation of +/−10° is possible.

An expansible fixing plug having regions with different expansion directions has the advantage that the fixing plug has not only a preferred expansion direction but at least two expansion directions. The expansion forces arising during expansion of the expansion region and the sleeve are accordingly introduced into the anchoring substrate and distributed in different radial directions, with the result that relatively large forces can be introduced from the expansible fixing plug into the anchoring substrate.

BRIEF DESCRIPTION OF THE DRAWINGS

The invention is explained in greater detail below with reference to two exemplary embodiments, wherein.

DETAILED DESCRIPTION OF THE INVENTION

Figure 1:
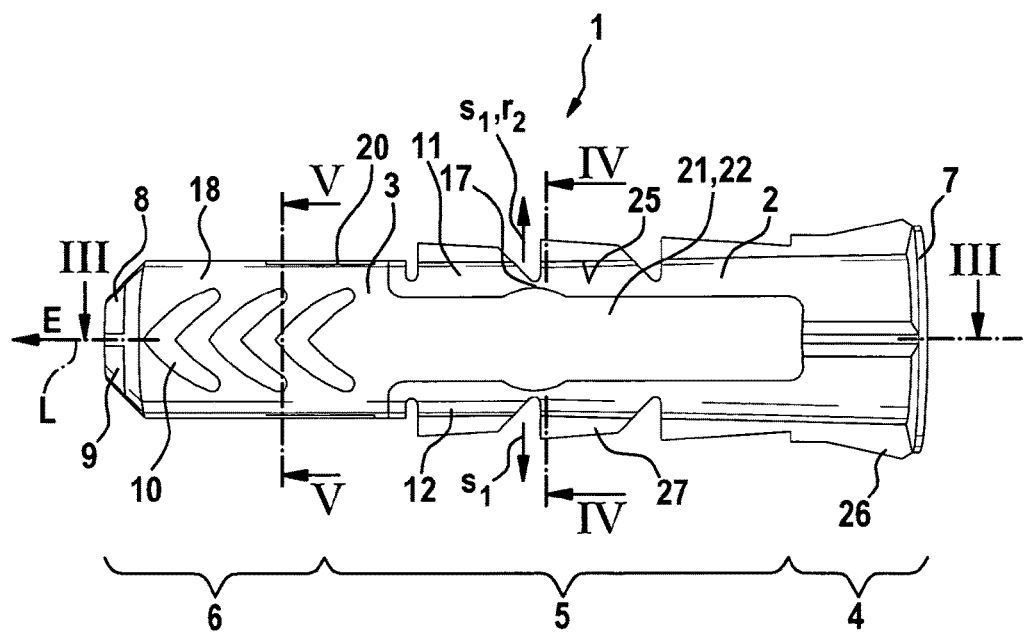
FIG. 1 is a side view of a first expansible fixing plug according to the invention.
Figure 2:
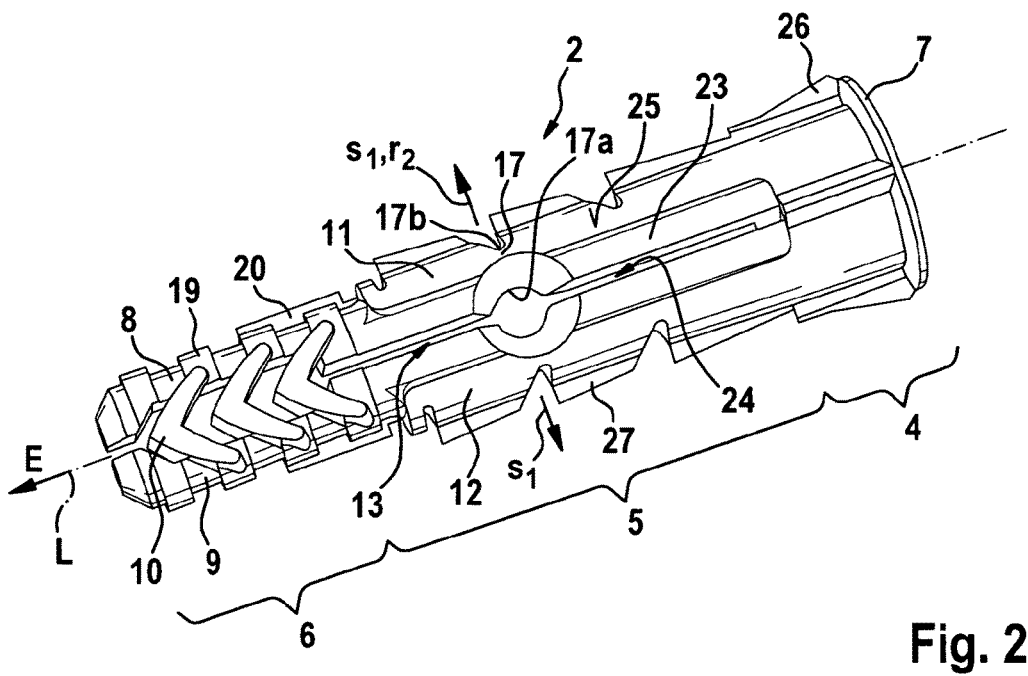
FIG. 2 is a perspective side view of the main body of the first expansible fixing plug.

FIGS. 1 to 5 show a first expansible fixing plug 1 according to the invention which, for fixing an object (not shown), can be introduced into a drilled hole (not shown) and expanded with an expander element, especially a screw (not shown). The expansible fixing plug 1 consists of a main body 2 made of a first plastics material and a casing 3 made of a second plastics material different from the first plastics material. In the exemplary embodiment, the first plastics material is a polyamide, while the second plastics material is a polypropylene. In FIG. 2 the main body 2 is shown without the casing 3 and consists of an insertion sleeve 4, which is arranged at the rear of the main body 2 in the direction of introduction E, an expansion region 5 which adjoins the insertion sleeve 4 in the direction of introduction E, and a sleeve 6 arranged at the front of the main body 2. The direction of introduction E is the direction in which the expansible fixing plug 1 is introduced as intended into a drilled hole. In the exemplary embodiment, the insertion sleeve 4, through which an expander element can be introduced as intended into the expansible fixing plug 1, is in the form of a short hollow cylinder which extends along the longitudinal axis L and on the outer side of which there are arranged four rear anti-rotation ribs 26. At the rear end of the insertion sleeve 4 there is arranged a circumferential collar 7 which forms the rear end of the main body 2 and of the expansible fixing plug 1 and prevents the expansible fixing plug 1 from being introducible too deeply into a drilled hole. The sleeve 6 arranged at the front of the main body 2 consists of two half-shell-like sleeve parts 8, 9 which are connected to one another by three V-shaped resilient connectors 10, so that, on introduction of an expander element, the sleeve 6 is expansible in the radial direction, with the connectors 10 being stretched in the radial direction. Between the sleeve 6 and the insertion sleeve 4, the expansion region 5 extends along the longitudinal axis L.

The expansion region 5 has two expansion tongues 11, 12 which are formed by a first slot 13 which extends in the longitudinal direction of the expansible fixing plug 1 and in a first radial direction $r_1$ and passes completely through the main body 2 in the expansion region 5. In FIGS. 1 and 2 the first radial direction $r_1$ runs perpendicular to the plane of the drawing. The axial length of the first slot 13 defines the axial length of the expansion tongues 11, 12 and accordingly the length of the expansion region 5. Because the two expansion tongues 11, 12 are completely separated from one another by the first slot 13, on introduction of an expander element the expansion tongues 11, 12 can be moved away from one another and expanded in a first expansion direction $s_1$. The first expansion direction $s_1$ is orthogonal with respect to a plane in which the first slot 13 is located. In order that the expansion tongues 11, 12 can be expanded by even a small expansion force produced on insertion of an expander element into the expansion region 5 and acting in the first expansion direction $s_1$, the expansion tongues 11, 12 have local weakened positions 17 which act as predetermined bending points. The weakened positions 17 are arranged in the expansion region 5 approximately centrally in the longitudinal direction on the expansion tongues 11, 12 between the sleeve 6 and the insertion sleeve 4 and each consist of two parts: an inner part 17a, which is arranged on the inside of the expansion tongues 11, 12 in the radial direction and which is in the form of a conically sloping, circular-segment-shaped hollow, and an outer part 17b, which is arranged on the outside of the expansion tongues 11, 12 in the radial direction and which has a slot-like or wedge-like shape. On expansion, the two expansion tongues 11, 12 buckle outwards at the weakened positions 17 and are moved away from one another in the first expansion direction $s_1$ and orthogonally with respect to the first radial direction $r_1$ or to a plane in which the first slot 13 is located.

Figure 3:
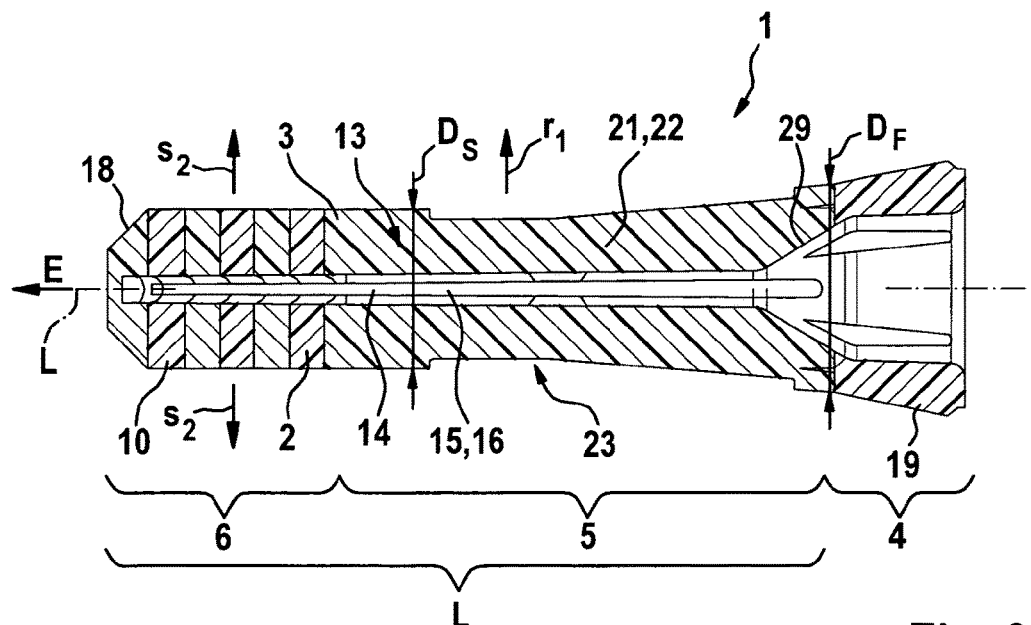
FIG. 3 is an axial section through the first expansible fixing plug along the axis III-III.
Figure 4:
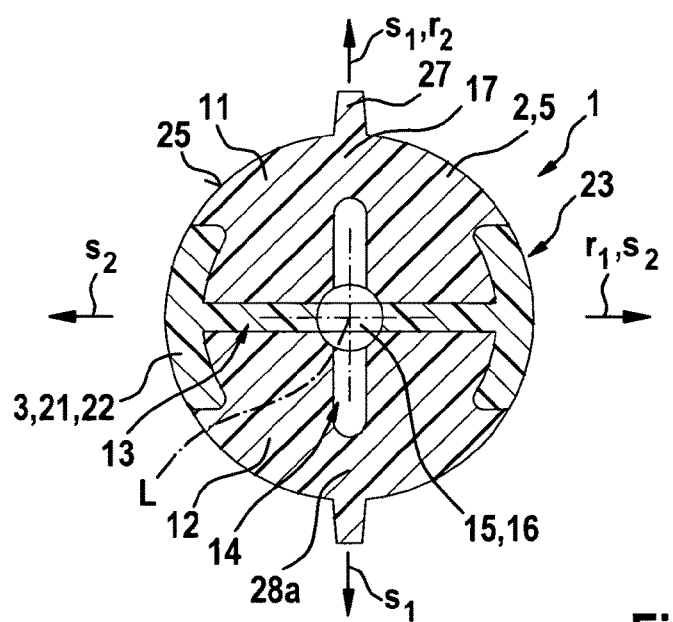
FIG. 4 is a section through the first expansible fixing plug along the axis IV-IV.
Figure 5:
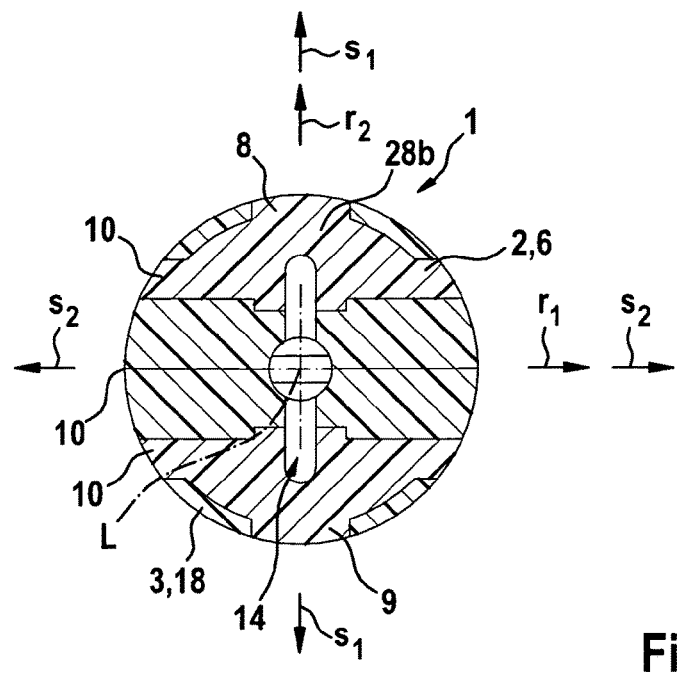
FIG. 5 is a section through the first expansible fixing plug along the axis V-V.

As shown in FIGS. 3 and 4, the first slot 13, together with a second slot 14, forms in the expansion region 5 an expansion channel 15 for receiving an expander element (not shown). The second slot 14 extends in the longitudinal direction of the expansible fixing plug 1 and in a second radial direction $r_2$ which is orthogonal with respect to the first radial direction $r_1$ and parallel to the first expansion direction $s_1$. As a result of the two slots 13, 14, which intersect one another and are inclined with respect to one another, the expansion channel 15 is cross-shaped and has, in the region in which the two slots 13, 14 intersect, a central screw channel 16 of circular cross-section. The screw channel 16 serves to guide a screw (not shown) which is screwed into the expansion channel 15 as expander element and extends into the sleeve 6. The second slot 14 extends in the second radial direction $r_2$ only to an extent such that it does not pass through the main body 2 in the expansion region 5. The second slot 14 weakens the expansion tongues 11, 12 locally so that there is formed on the expansion tongues 11, 12 a kind of hinge 28a which runs parallel to the longitudinal axis L and has the effect that the expansion tongues 11, 12, which are almost semi-circular in cross-section, can adapt to an uneven wall of a drilled hole (not shown).

While the first slot 13 is arranged exclusively in the expansion region 5 and does not extend into the sleeve 6, and accordingly defines the length of the expansion region 5, the second slot 14 extends into the sleeve 6 and, like the screw channel 16, runs almost as far as to the front end of the expansible fixing plug 1, as can be seen in FIG. 3. The second slot 14 likewise does not pass through the two sleeve parts 8, 9 in the radial direction, with the result that in the two sleeve parts 8, 9 there are likewise formed hinges 28b in such a way that the two sleeve parts 8, 9 can themselves likewise be deformed along an axis running parallel to the longitudinal axis L. In addition, the second slot 14 divides the sleeve 6 in the interior of the sleeve 6, with the result that the second slot 14 defines a second expansion direction $s_2$ running orthogonally with respect to the slot 14, in which direction the sleeve 6 is substantially expanded on introduction of an expander element. As a result of the resilient connectors 10, the sleeve 6 will also become wider in the second radial direction $r_2$ but not to the extent possible in the second expansion directions $s_2$ as a result of the second slot 14. Since the slots 13, 14 are orthogonal with respect to one another, on introduction of an expander element the expansion region 5 expands substantially in the first radial expansion direction $s_1$, while the sleeve 6 expands substantially in the second radial expansion direction $s_2$ which is different therefrom and is orthogonal with respect to the first expansion direction $s_1$.

The sleeve 6 is partly encased by a casing body 18 of the casing 3. In order to prevent the casing 3 from being displaced relative to the sleeve 6 on expansion of the expansible fixing plug 1, ribs 19 and elongate blocks 20 are arranged on the outside of the sleeve 6 of the main body 2. Four ribs 19 are formed on each of the two sleeve parts 8, 9 in the form of radially outwardly located parts of a circular ring which run in the circumferential direction and are spaced apart from one another in the longitudinal direction, which parts are surrounded and enclosed by the casing body 18 in such a way that the ribs 19 hold the casing body 18 in fixed axial position on the sleeve 6. The distances between adjacent ribs 19 correspond to the axial extent of the ribs 19. The two blocks 20 are parallelepipedal in shape and run in the longitudinal direction of the expansible fixing plug 1. A block 20 is arranged on each rear part of the sleeve 6, the blocks 20 extending into the expansion region 5. The blocks 20 are surrounded in the circumferential direction and in the longitudinal direction by the casing 3 which they pass through in the radial direction. The blocks 20 prevent movement of the casing body 18 on the sleeve 6 in the circumferential direction.

Figure 6:
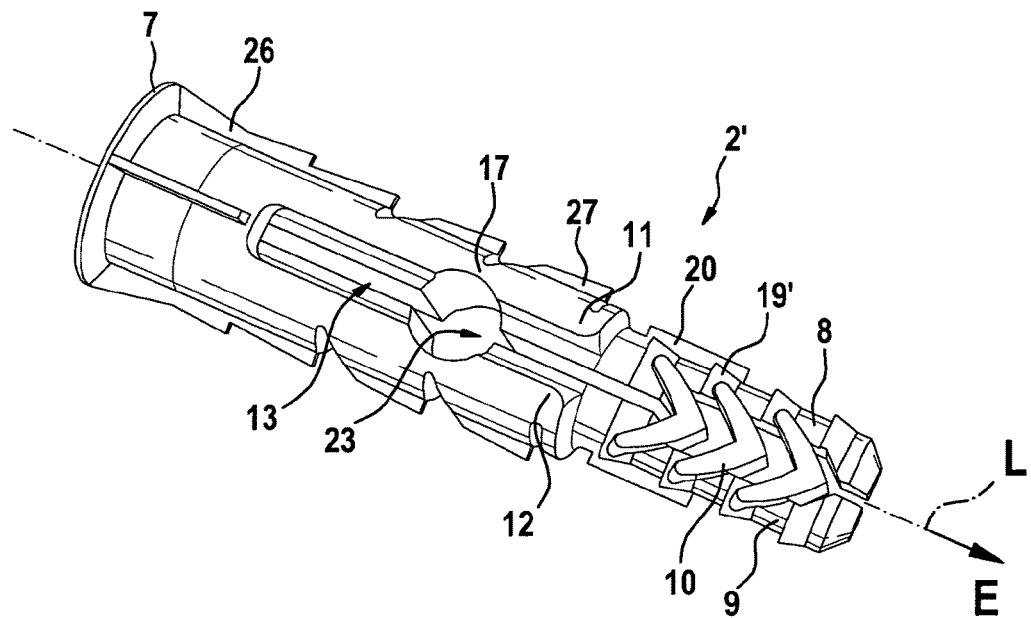
FIG. 6 is a perspective side view of the main body of a second expansible fixing plug according to the invention.

FIG. 6 shows an alternative main body 2' in which the ribs 19' slope wedge-like in the direction of introduction E, with the result that limited movement of the casing body 18 on the sleeve 6 is possible. As a result of the wedge-like slope, movement of the casing body 18 in a direction opposite to the direction of introduction E results in additional expansion of the casing body 18, which improves the holding power of the expansible fixing plug 1 in a drilled hole.

On the casing body 18 there are arranged two casing elements 21 in the form of wing elements 22 which, starting from the casing body 18, extend cantilever-like into the expansion region 5 in a direction opposite to the direction of introduction E and substantially in the longitudinal direction L (see FIGS. 1, 3 and 4). The two wing elements 22 are arranged on radially opposite sides of the expansion region 5 of the expansible fixing plug 1 and, apart from being connected via the casing body 18, are not connected to one another. The connection to the casing body 18 is integral, rigid and resistant to bending. The two wing elements 22 lie in openings 24 which are formed by groove-like, parallelepipedal recesses 23, the first slot 13 and the inner parts 17a of the weakened positions 17 in the expansion region 5. The recesses 23 run on the outside of the expansible fixing plug 1 in the longitudinal direction thereof and are relatively small in relation to the size of the expansion tongues 11, 12 and weaken the expansion tongues 11, 12 only to a negligible extent. The two wing elements 22 are accordingly also arranged between the two expansion tongues 11, 12 and extend over the entire length of the expansion region 5. The wing elements 22, which are made of the second plastics material, completely fill the first slot 13, from an outer face 25 of the expansible fixing plug 1 to the screw channel 16, and also the openings 24 and the inner parts 17a of the weakened position 17. The internally located second slot 14, however, is not filled with the second plastics material of the casing 3. In order that the insertion of an expander element into the expansion region 5 is not impeded by the wing elements 22, at their rear ends 29 that face the insertion sleeve 4 the wing elements 22 slope on the inside with respect to the longitudinal axis L of the expansible fixing plug 1. The wing elements 22 are of cantilever-like construction such that they expand even under very small expansion forces, especially when the expander element presses only against the rear ends 29 of the wing elements 22. The design of the wing elements 22 as cantilevers has the advantage that the expansion forces act on the rear ends 29 of the wing elements 22 with a large lever arm towards the site of connection with the casing body 18, so that even a small expansion force is sufficient to press the rear ends 29 of the wing elements 22 radially outwards despite the bending-resistant connection to the casing body 18. In the unexpanded state of the expansible fixing plug 1, that is to say before the insertion of an expander element into the expansion channel 15, the wing elements 22 project beyond the main body 2 in the radial direction in the expansion region 5. This becomes clear in the sectional view in FIG. 3: the expansion region 5 has a constant external diameter $D_S$ over its length, while the two wing elements 23 in the rear region widen wedge-like in a direction opposite to the direction of introduction E so that in the region of their rear ends 29 they have a larger diameter $D_F$ than the expansion region 5. The wing elements 23, together with the rear anti-rotation ribs 26 and two front anti-rotation ribs 27, which are formed on the outside of the expansion tongues 11, 12 and extend, in some places discontinuously, over the length of the expansion region 5, counteract co-rotation of the expansible fixing plug 1 in a drilled hole when an expander element is screwed into the expansion channel 15.

Because the openings 24 in the expansion region 5 and regions between the sleeve parts 8, 9 of the sleeve 6 are filled with the second plastics material, when the expansible fixing plug 1 is expanded in a drilled hole surrounding the expansible fixing plug 1 it is possible for a relatively large amount of material to be pressed against the wall of the drilled hole, the use of different plastics materials enabling the parts of the expansible fixing plug 1 to remain movable with respect to one another and readily deformable for expansion. As a result, the expansible fixing plug 1 can have a very compact and short shape, with the ratio between the length L from the front end of the sleeve 6 to the rear end of the expansion region 5 and the diameter $D_S$ of the expansion region 5 being approximately 5.

LIST OF REFERENCE SYMBOLS

1 expansible fixing plug
2, 2' main body
3 casing
4 insertion sleeve
5 expansion region
6 sleeve
7 collar
8 first sleeve part
9 second sleeve part
10 connector
11 first expansion tongue
12 second expansion tongue
13 first slot
14 second slot
15 expansion channel
16 screw channel
17 weakened position
17a inner part of the weakened position 17
17b outer part of the weakened position 17
18 casing body
19, 19' rib
20 block
21 casing element
22 wing element
23 recess
24 opening
25 outer face of the expansion region 5
26 rear anti-rotation rib
27 front anti-rotation rib
28a hinge of an expansion tongue 11, 12
28b hinge of a sleeve part 8, 9
29 rear end of a wing element 22
$D_F$ external diameter of the wing elements 22
$D_S$ external diameter of the expansion region 5
E direction of introduction
L longitudinal axis
$r_1$ first radial direction
$r_2$ second radial direction
$s_1$ first expansion direction
$s_2$ second expansion direction

The invention claimed is:

1. An expansible fixing plug which consists of at least two different plastic material, comprising:
a main body made of a first plastic material, which is at least partly encased by a casing made of a second plastic material, wherein the main body has an expansion region which extends along a longitudinal axis, the expansion region having at least two expansion tongues which are separated from one another by a first slot;
a sleeve arranged at a front of the expansible fixing plug in a direction of introduction, wherein the sleeve is connected to the expansion region and is at least partly encased by a casing body formed by the casing; and
at least one wing element arranged on the casing body, the at least one wing element being cantilever-like and having a front end connected integrally with the casing body and a rear end that is unconnected to the casing body and moveable radially outwardly, the at least one wing element extending from the casing body in a direction opposite to the direction of introduction and substantially in the longitudinal direction.

2. The expansible fixing plug according to claim 1, wherein the at least one wing element includes a plurality of wing elements which are not connected to one another at their rear ends.

3. The expansible fixing plug according to claim 2, wherein the plurality of wing elements are connected to one another exclusively by the casing body.

4. The expansible fixing plug according to claim 1, wherein the at least one wing element lies in an opening arranged in the expansion region.

5. The expansible fixing plug according to claim 1, wherein the at least one wing element extends over at least an entire length of the expansion region.

6. The expansible fixing plug according to claim 1, wherein the at least one wing element includes exactly two wing elements arranged between the at least two expansion tongues.

7. The expansible fixing plug according to claim 1, wherein the at least one wing element slopes at its rear end.

8. The expansible fixing plug according to claim 1, wherein the at least one wing element, in an unexpanded state, projects beyond the main body in a radial direction in the expansion region.

9. The expansible fixing plug according to claim 1, wherein a second slot is arranged in the sleeve, the second slot being inclined with respect to the first slot.

10. The expansible fixing plug according to claim 1, wherein, on introduction of an expander element, the expansion region is expandable substantially in a first radial expansion direction, while the sleeve is expandable substantially in a second radial expansion direction different therefrom.

11. An expansible fixing plug which consists of at least two different plastic material, comprising:
a main body made of a first plastic material, which is at least partly encased by a casing made of a second plastic material, wherein the main body has an expansion region which extends along a longitudinal axis, the expansion region having at least two expansion tongues which are separated from one another by a first slot;

a sleeve arranged at a front of the expansible fixing plug in a direction of introduction, wherein the sleeve is connected to the expansion region and is at least partly encased by a casing body formed by the casing; and at least one wing element arranged on the casing body, the at least one wing element being cantilever-like and extendible from the casing body in a direction opposite to a direction of introduction and substantially in the longitudinal direction, wherein the at least one wing element lies in an opening arranged in the expansion region.

12. An expansible fixing plug which consists of at least two different plastic material, comprising:

a main body made of a first plastic material, which is at least partly encased by a casing made of a second plastic material, wherein the main body has an expansion region which extends along a longitudinal axis, the expansion region having at least two expansion tongues which are separated from one another by a first slot;

a sleeve arranged at a front of the expansible fixing plug in a direction of introduction, wherein the sleeve is connected to the expansion region and is at least partly encased by a casing body formed by the casing; and at least one wing element arranged on the casing body, the at least one wing element being cantilever-like and extendible from the casing body in a direction opposite to a direction of introduction and substantially in the longitudinal direction, wherein the at least one wing element extends over at least an entire length of the expansion region.

* * * * *